US007341420B1

(12) United States Patent
Anderson

(10) Patent No.: US 7,341,420 B1
(45) Date of Patent: Mar. 11, 2008

(54) EQUIPMENT STORAGE LIFT SYSTEM

(76) Inventor: Gene M. Anderson, 1102 76th Ave. South, Fargo, ND (US) 58104

( * ) Notice: Subject to any disclaimer, the term of this patent is extended or adjusted under 35 U.S.C. 154(b) by 8 days.

(21) Appl. No.: 10/836,477

(22) Filed: Apr. 30, 2004

(51) Int. Cl.
*B60P 1/00* (2006.01)
*B60P 1/04* (2006.01)
*B65F 1/00* (2006.01)
*B65F 3/00* (2006.01)
*B62B 1/00* (2006.01)

(52) U.S. Cl. ...................... 414/546; 414/469; 414/477; 414/556

(58) Field of Classification Search ................ 414/462, 414/484, 469, 477, 546; 187/269; 280/414.1
See application file for complete search history.

(56) References Cited

U.S. PATENT DOCUMENTS

| | | | | |
|---|---|---|---|---|
| 3,556,320 | A | 1/1971 | Henderson | 214/16 |
| 3,677,425 | A * | 7/1972 | Patten | 414/538 |
| 4,068,772 | A * | 1/1978 | Prudhomme | 414/477 |
| 4,406,477 | A * | 9/1983 | McDonald | 280/414.1 |
| 4,412,601 | A | 11/1983 | Cooper | 187/27 |
| 4,469,346 | A * | 9/1984 | Low | 280/414.1 |
| 4,589,814 | A * | 5/1986 | Cates | 414/484 |
| 4,749,317 | A * | 6/1988 | Daniel | 410/26 |
| 4,784,545 | A * | 11/1988 | Lawrence | 410/26 |
| 4,954,038 | A | 9/1990 | Sheahan | 414/482 |
| 5,199,843 | A | 4/1993 | Sferra | 414/592 |
| 5,468,115 | A * | 11/1995 | Alvis | 414/556 |
| 5,511,924 | A | 4/1996 | Liang | 414/229 |
| 5,772,388 | A * | 6/1998 | Clark | 414/484 |
| 5,871,070 | A | 2/1999 | Contreras | 187/263 |
| 6,241,048 | B1 | 6/2001 | Heilmann | 187/263 |
| 6,474,626 | B1 | 11/2002 | Box | 254/131 |
| 2002/0063102 | A1 | 5/2002 | Hanneken | 211/113 |

FOREIGN PATENT DOCUMENTS

| | | |
|---|---|---|
| DE | 19814494 | 4/1998 |
| GB | 2273283 | 6/1994 |

* cited by examiner

*Primary Examiner*—Peter M. Cuomo
*Assistant Examiner*—Eric E. Pico

(57) ABSTRACT

An equipment storage lift system for efficiently storing a plurality of equipment. The equipment storage lift system includes a base, a platform, a plurality of legs extending between the platform and the base, a front structure extending from the base and a winch attached to the front structure. The legs support the platform in a substantially level position in both the raised position and the lowered position.

2 Claims, 9 Drawing Sheets

EQUIPMENT STORAGE LIFT SYSTEM

CROSS REFERENCE TO RELATED APPLICATIONS

Not applicable to this application.

STATEMENT REGARDING FEDERALLY SPONSORED RESEARCH OR DEVELOPMENT

Not applicable to this application.

BACKGROUND OF THE INVENTION

1. Field of the Invention

The present invention relates generally to storage devices and more specifically it relates to an equipment storage lift system for efficiently storing larger equipment.

2. Description of the Related Art

Outdoor equipment (e.g. snowmobiles, ATVs, motorcycles, personal watercraft, bicycles, lawn mowers, garden tillers, small trailers, snow blowers, etc.) are difficult to store because of their relatively large size and shapes. Conventional outdoor equipment is typically stored within a garage or similar storage unit. The outdoor equipment is typically parked upon the floor of the garage taking up valuable space within the garage. It is difficult to place additional items on top of the outdoor equipment, particularly larger equipment. Hence, there is a need for a long-term storage system that is capable of storing a plurality of larger equipment devices.

BRIEF SUMMARY OF THE INVENTION

In view of the foregoing disadvantages inherent in the known types of equipment storage systems now present in the prior art, the present invention provides a new equipment storage lift system construction wherein the same can be utilized for efficiently storing larger equipment.

The present invention generally comprises a base, a platform, a plurality of legs extending between the platform and the base, a front structure extending from the base and a winch attached to the front structure. The legs support the platform in a substantially level position in both the raised position and the lowered position.

There has thus been outlined, rather broadly, the more important features of the invention in order that the detailed description thereof may be better understood, and in order that the present contribution to the art may be better appreciated. There are additional features of the invention that will be described hereinafter and that will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting.

A primary object of the present invention is to provide an equipment storage lift system that will overcome the shortcomings of the prior art devices.

A second object is to provide an equipment storage lift system for efficiently storing larger equipment.

Another object is to provide an equipment storage lift system that allows a piece of equipment to be driven upon.

An additional object is to provide an equipment storage lift system that does not require manual lifting of heavy equipment.

A further object is to provide an equipment storage lift system that efficiently utilizes storage space.

Another object is to provide an equipment storage lift system that is capable of elevating and storing various sizes, weights and types of equipment.

Other objects and advantages of the present invention will become obvious to the reader and it is intended that these objects and advantages are within the scope of the present invention.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein.

DETAILED DESCRIPTION OF THE INVENTION

A. Overview

Figure 1:
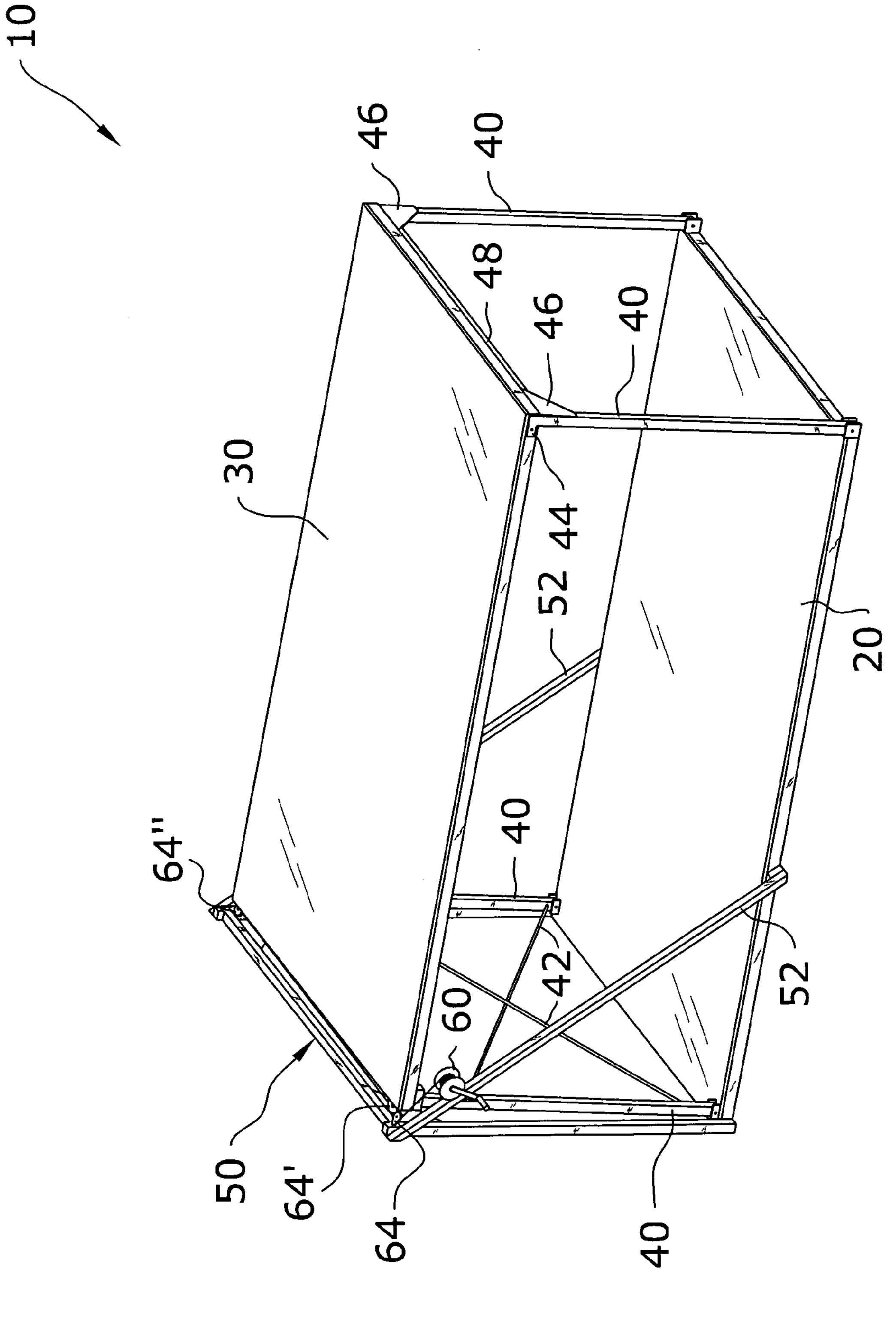
FIG. 1 is an upper perspective view of the present invention with the platform in the raised position.

Turning now descriptively to the drawings, in which similar reference characters denote similar elements throughout the several views, FIGS. 1 through 9 illustrate an equipment storage lift system 10, which comprises a base 20, a platform 30, a plurality of legs 40 extending between the platform 30 and the base 20, a front structure 50 extending from the base 20 and a winch 60 attached to the front structure 50. The legs 40 support the platform 30 in a substantially level position in both the raised position and the lowered position.

B. Base

Figure 2:
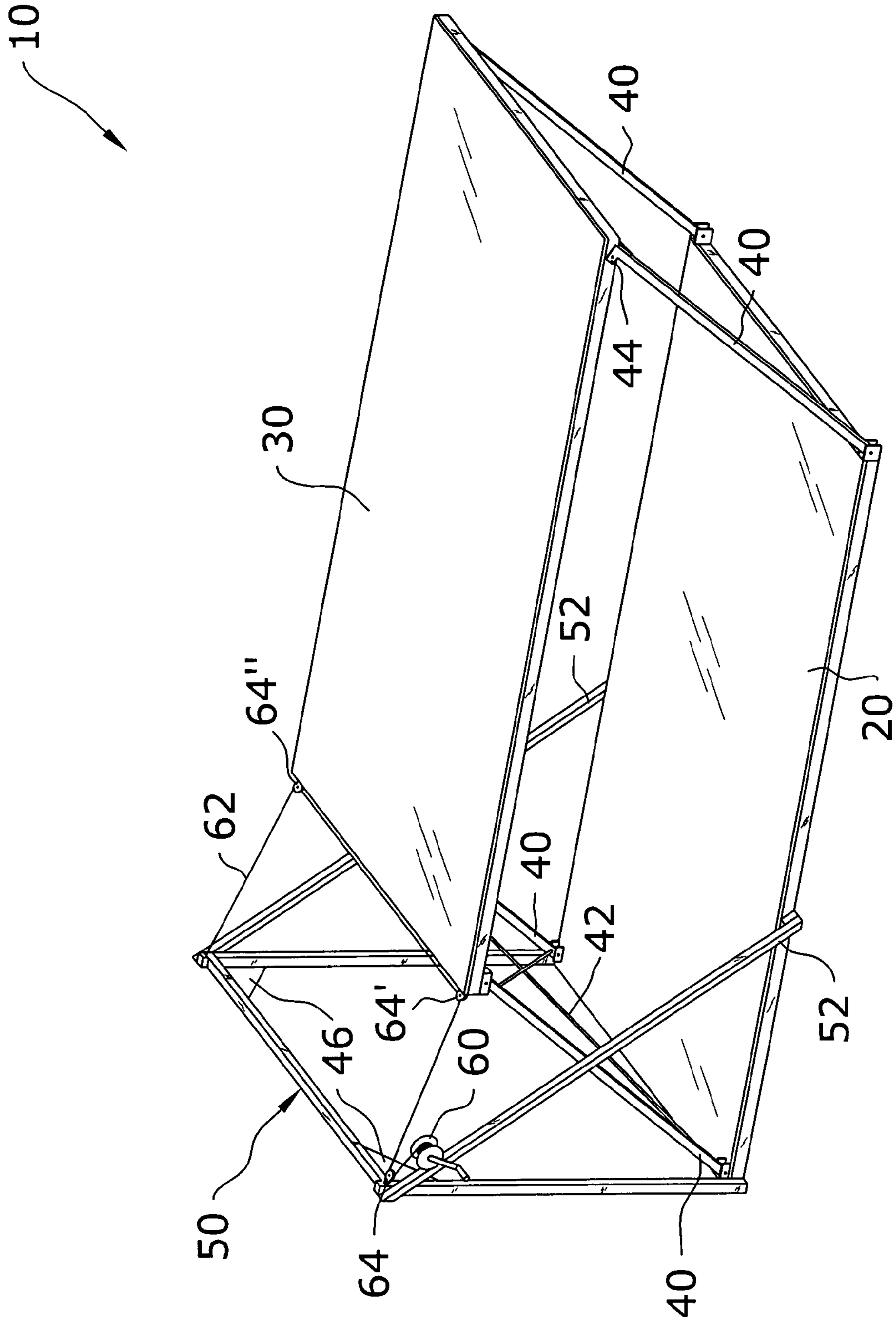
FIG. 2 is an upper perspective view of the present invention with the platform in the intermediate position.
Figure 8:
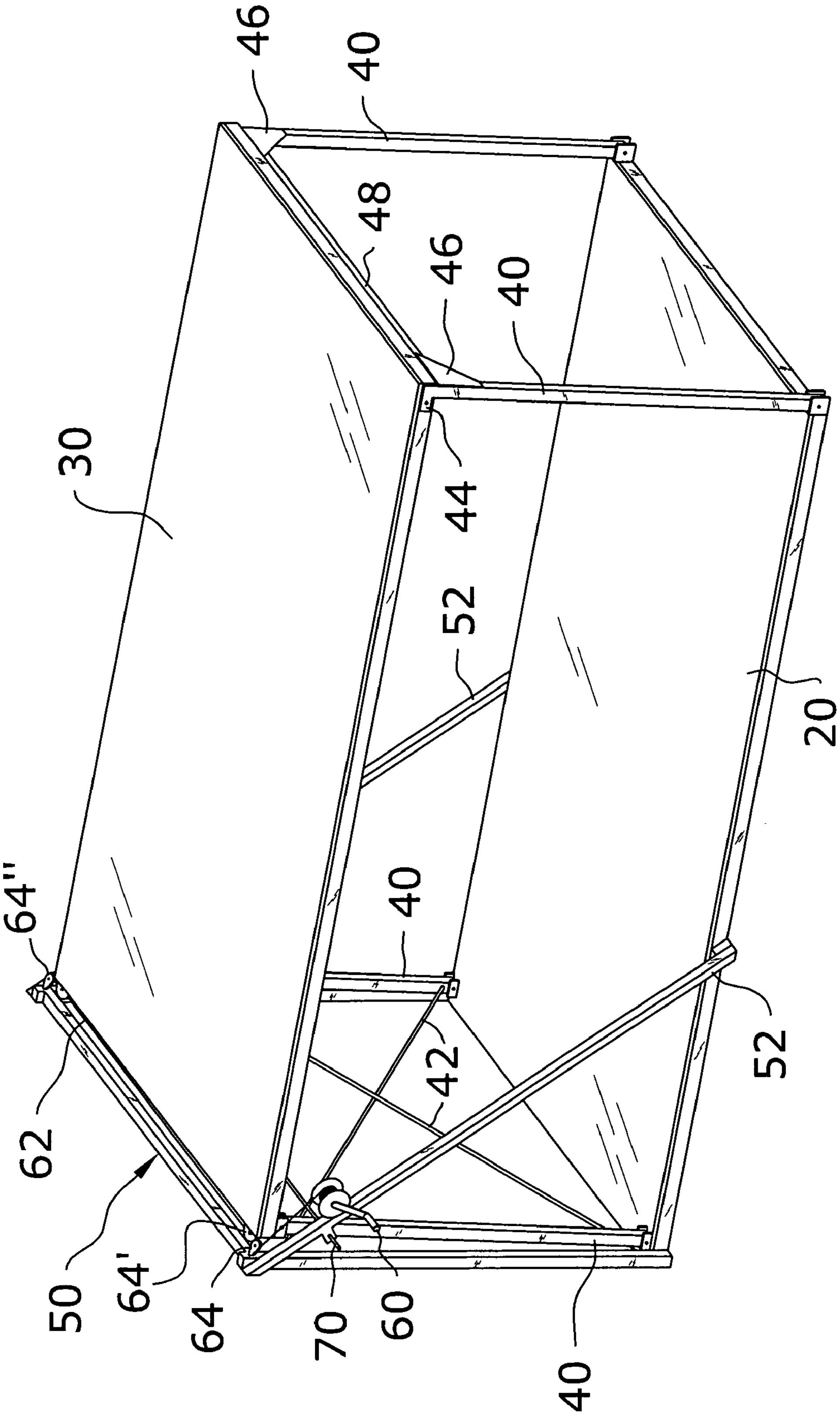
FIG. 8 is an upper perspective view of the present invention with a locking bar extending through the angled braces.

FIGS. 1, 2 and 8 illustrate the base 20. The base 20 is preferably comprised of a relatively flat structure for receiving a piece of equipment 12 (e.g. snowmobile, ATV, motorcycle, personal watercraft, bicycle, lawn mower, garden tiller, small trailer, snow blower, etc.). The base 20 may be comprised of various structures such as but not limited to a frame with a sheet member attached to the frame.

The base 20 preferably has a similar shape and size as the platform 30 as illustrated in FIGS. 1 and 2 of the drawings. The base 20 and the platform 30 may have various shapes such as but not limited to rectangular.

C. Platform

Figure 4:
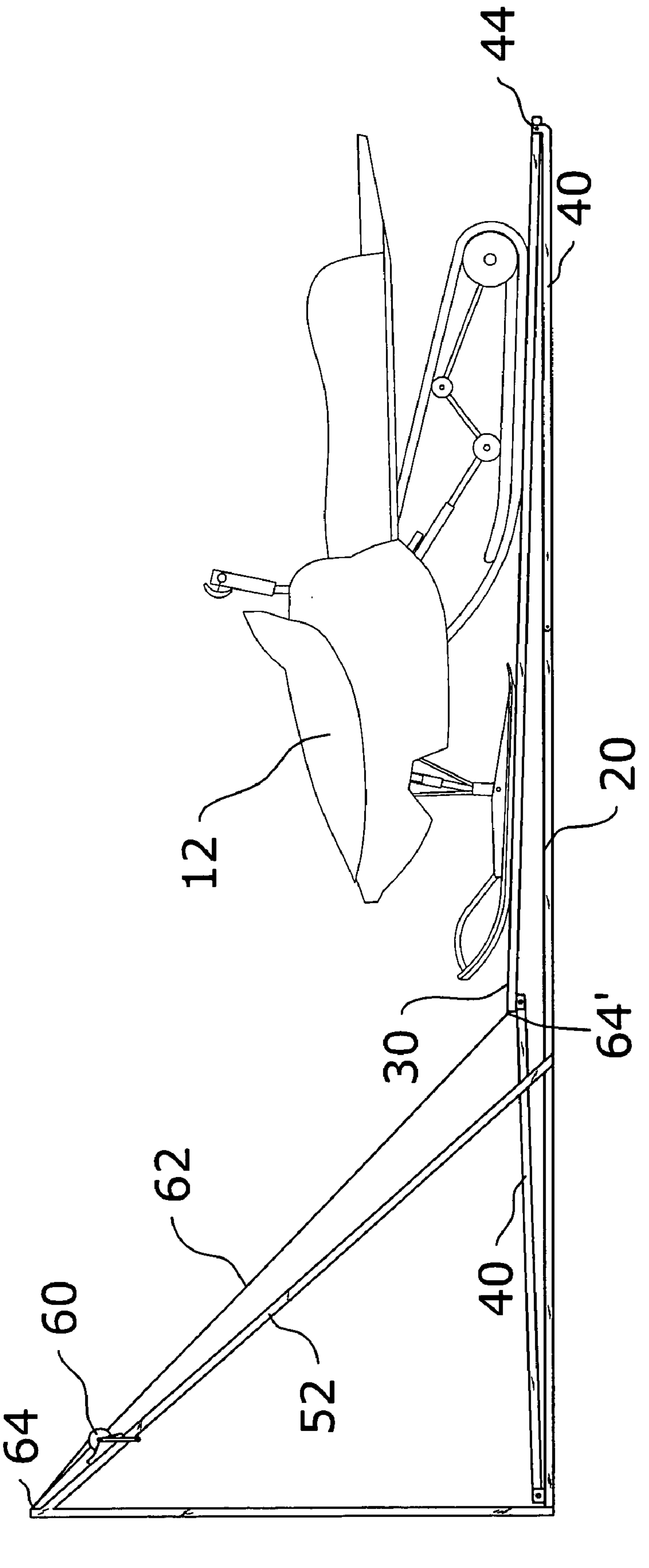
FIG. 4 is a side view of the present invention with the platform in the lowered position with a snowmobile being loaded.
Figure 6:
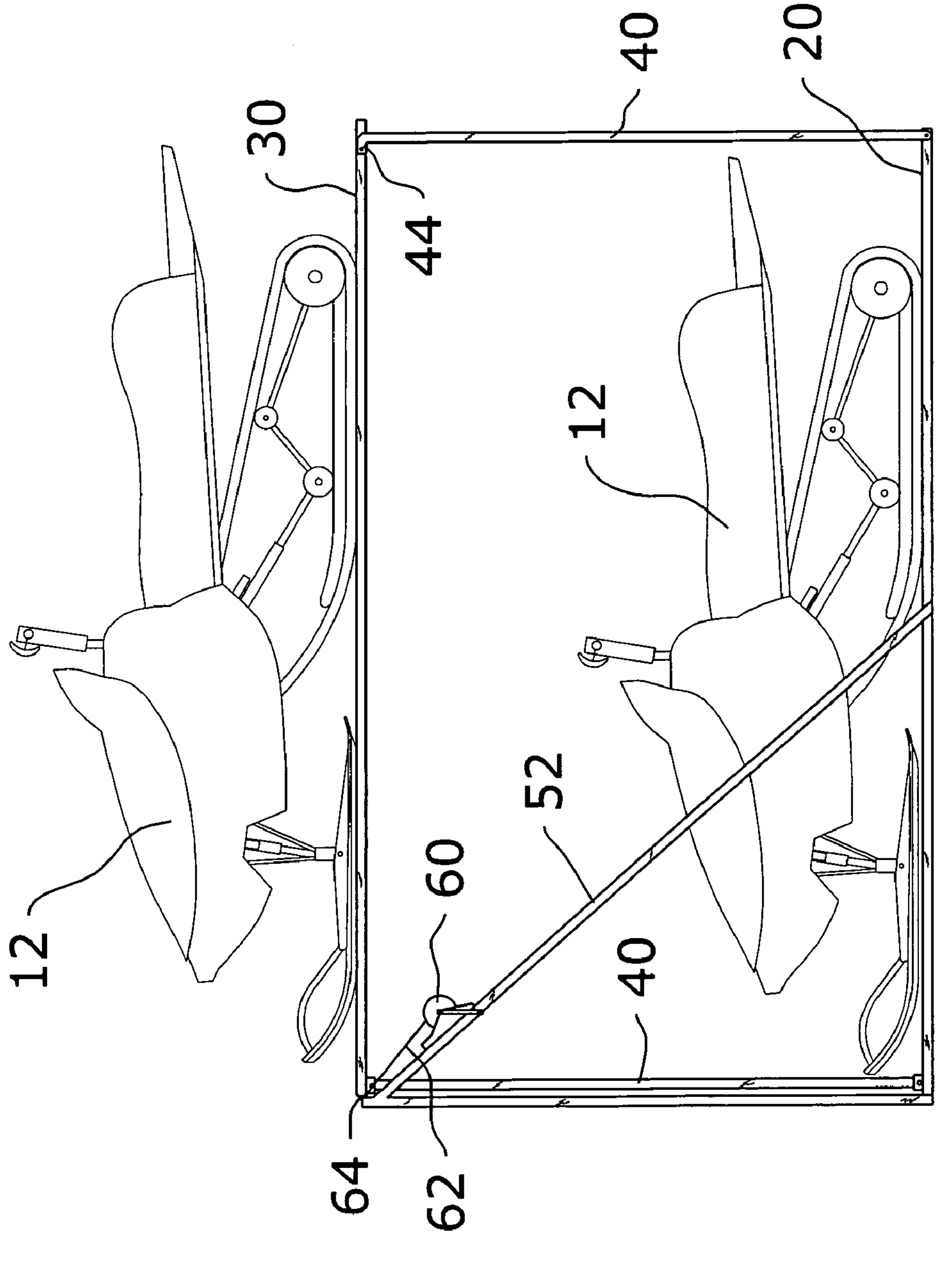
FIG. 6 is a side view of the present invention with the platform in the raised position and supporting a snowmobile with a second snowmobile positioned upon the base beneath the platform.

FIGS. 1, 2 and 8 best illustrate the platform 30 positioned above the base 20. The platform 30 is preferably substantially parallel to the base 20 when in the elevated position and when in the lowered position as illustrated in FIGS. 4 and 6 of the drawings.

The platform 30 is preferably comprised of a relatively flat structure for receiving a piece of equipment 12 (e.g. snowmobile, ATV, motorcycle, personal watercraft, bicycle, lawn mower, garden tiller, small trailer, snow blower, etc.). The platform 30 may be comprised of various structures such as but not limited to a frame with a sheet member attached to the frame.

D. Legs

The plurality of legs 40 each have a first end and a second end. The first end of the legs 40 are pivotally attached to the platform 30 and the second end of the legs 40 are pivotally attached to the base 20 as illustrated in FIGS. 1, 2, 5 and 6 of the drawings. The legs 40 are preferably substantially equal in length, however it can be appreciated that the legs 40 may have differing lengths.

The legs 40 are preferably comprised of a front pair of legs 40 and a rear pair of legs 40 as shown in FIGS. 1 and 2 of the drawings. The front pair of legs 40 are pivotally attached to respective front portions of the platform 30 and the base 20 as shown in FIG. 2 of the drawings. A pair of cross members 42 preferably extend in a crossing manner between the front pair of legs 40 to provide added stability to the platform 30.

Figure 9:
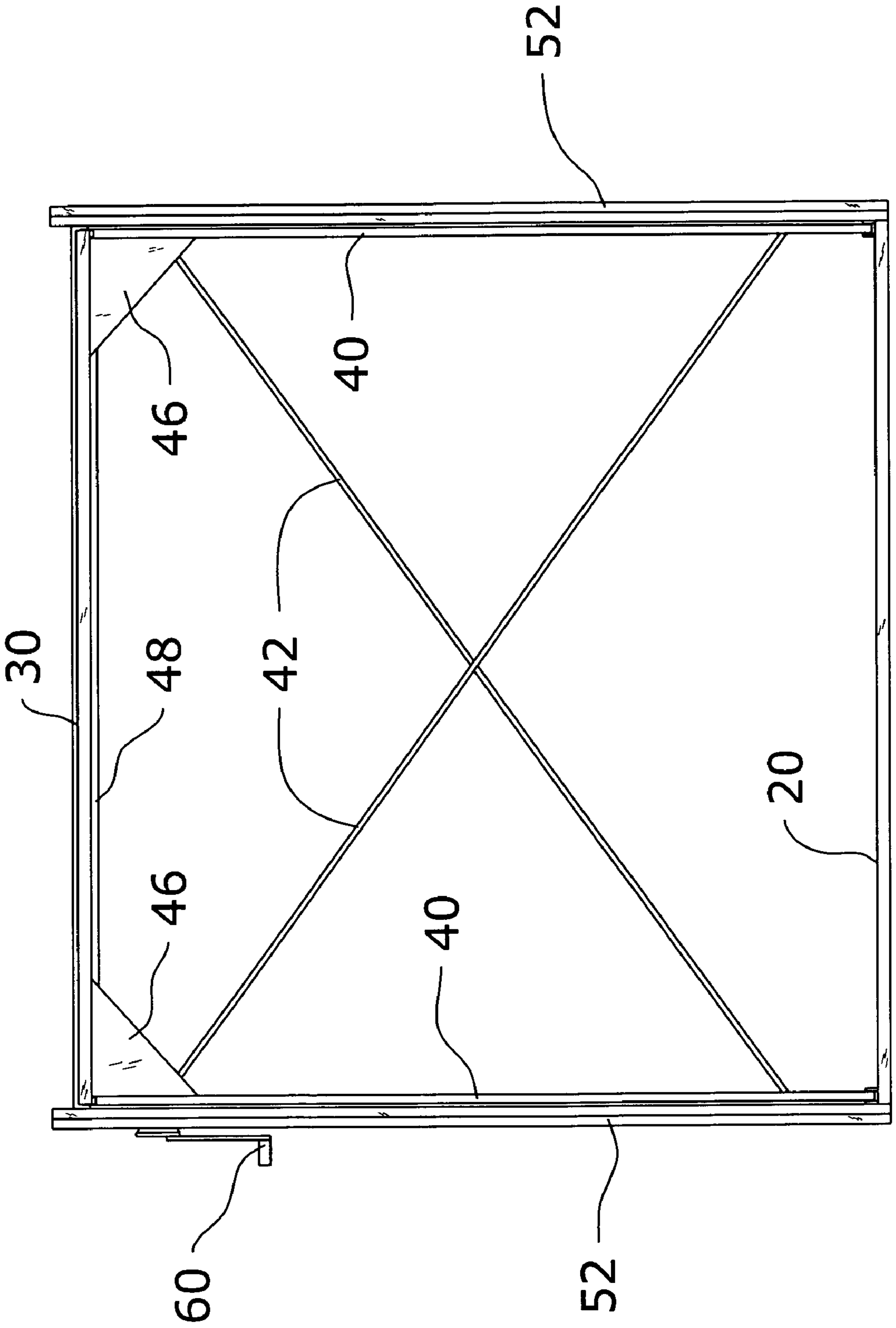
FIG. 9 is a rear view of the present invention illustrating the support brace extending between the rear pair of legs.

The rear pair of legs 40 are pivotally attached to respective rear portions of the platform 30 and the base 20. As shown in FIG. 9 of the drawings, the rear pair of legs 40 have a reinforcing member 48 extending between an upper portion thereof to provide reinforcement to the rear pair of legs 40. A pair of corner gussets 46 are preferably attached between the reinforcing member 48 and the rear pair of legs 40 as best shown in FIG. 9 of the drawings.

As shown in FIGS. 1 through 5 of the drawings, the rear pair of legs 40 preferably each include a bracket 44 for providing an offset pivot point. The brackets 44 are preferably angled or L-shaped to provide the offset pivot point as best illustrated in FIG. 1 of the drawings. The offset pivot point for the rear pair of legs 40 allows for the platform 30 to descend to its lowest possible position upon the floor for allowing equipment 12 to be easily driven upon the platform 30. In addition, the offset pivot point allows for the platform 30 to ascend easier than if the pivot point was inline with the front pair of legs 40. More particularly, the offset pivot point ensures that the rear pair of legs 40 begin an upward motion instantly when tension is placed on the cable 62.

E. Front Structure

Figure 3:
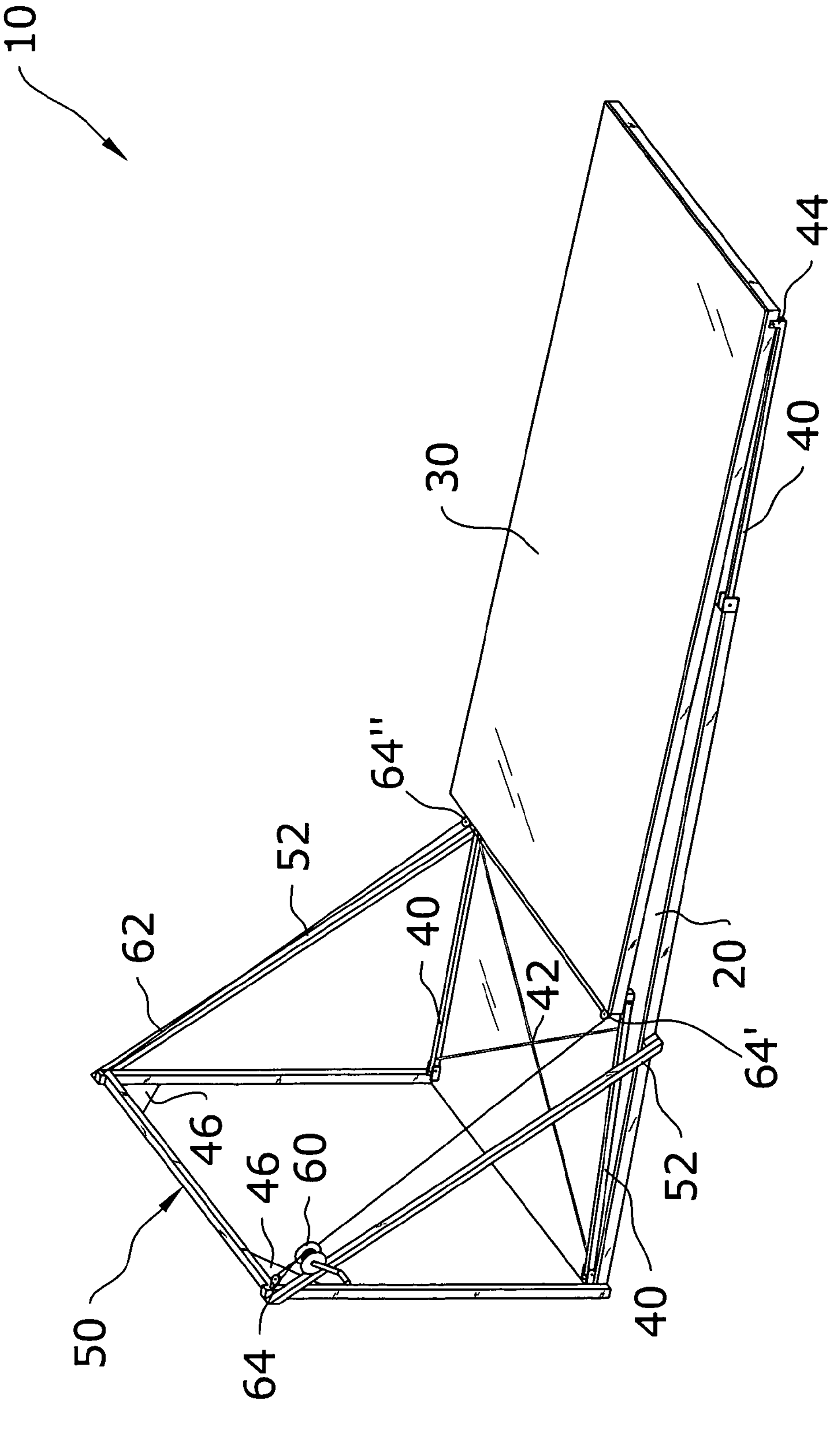
FIG. 3 is an upper perspective view of the present invention with the platform in the lowered position.

The front structure 50 extends from a front end portion of the base 20 as best illustrated in FIGS. 3 and 4 of the drawings. A pair of angled braces 52 preferably extend from an upper portion of the front structure 50 downwardly at an angle to the base 20 as shown in FIGS. 3 and 4 of the drawings. The angled braces 52 are preferably on the outside of the platform 30 and the legs 40 as shown in FIGS. 1 through 3 of the drawings.

F. Winch

The winch 60 is attached to the front structure 50 as shown in FIGS. 1 through 6 of the drawings. The winch 60 includes a cable 62 or other elongated structure attached to the platform 30 for raising and lowering the platform 30.

A first pulley 64 is attached to the front structure 50 as shown in FIG. 2 of the drawings. A second pulley 64' is attached to a front portion of the platform 30 and a third pulley 64" is attached to the front portion of the platform 30 as shown in FIG. 2. The cable 62 extends from the winch 60 through the first pulley 64 then through the second pulley 64 then through the third pulley 64 with a distal end of the cable 62 attached to the front structure 50 as best shown in FIG. 2 of the drawings. When the winch 60 draws the cable 62, the platform 30 is elevated and when the winch 60 extends the cable 62 the platform 30 is lowered.

G. Locking Bar

A locking bar 70 may be extendable through the angled braces 52 to prevent the front pair of legs 40 and the platform 30 from lowering in case there is a failure in the cable 62 and/or winch 60. The locking bar 70 may extending through apertures, brackets or other structures extending from the angled braces 52.

H. Operation of Invention

Figure 5:
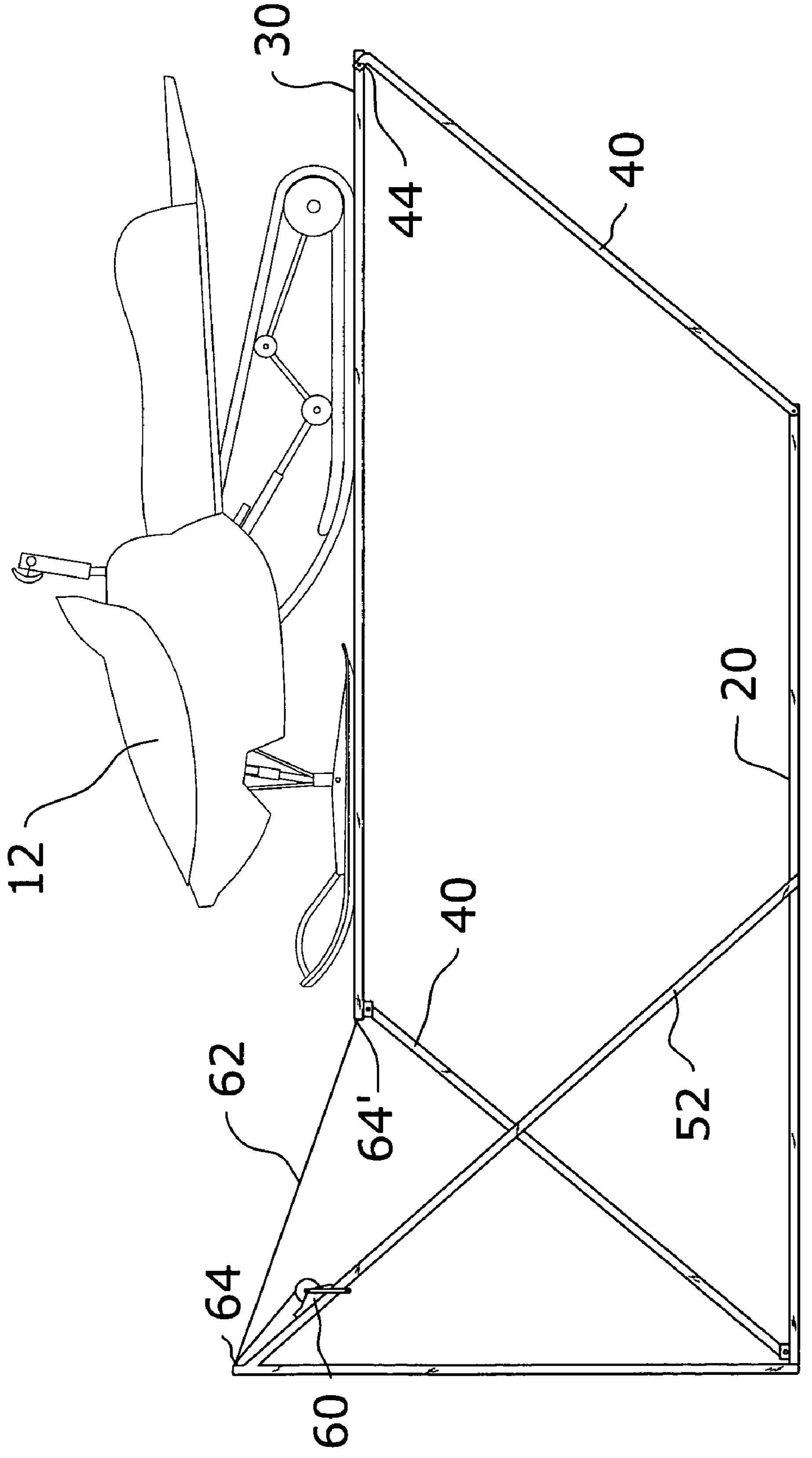
FIG. 5 is a side view of the present invention with the platform in the intermediate position with a snowmobile loaded on the platform.
Figure 7:
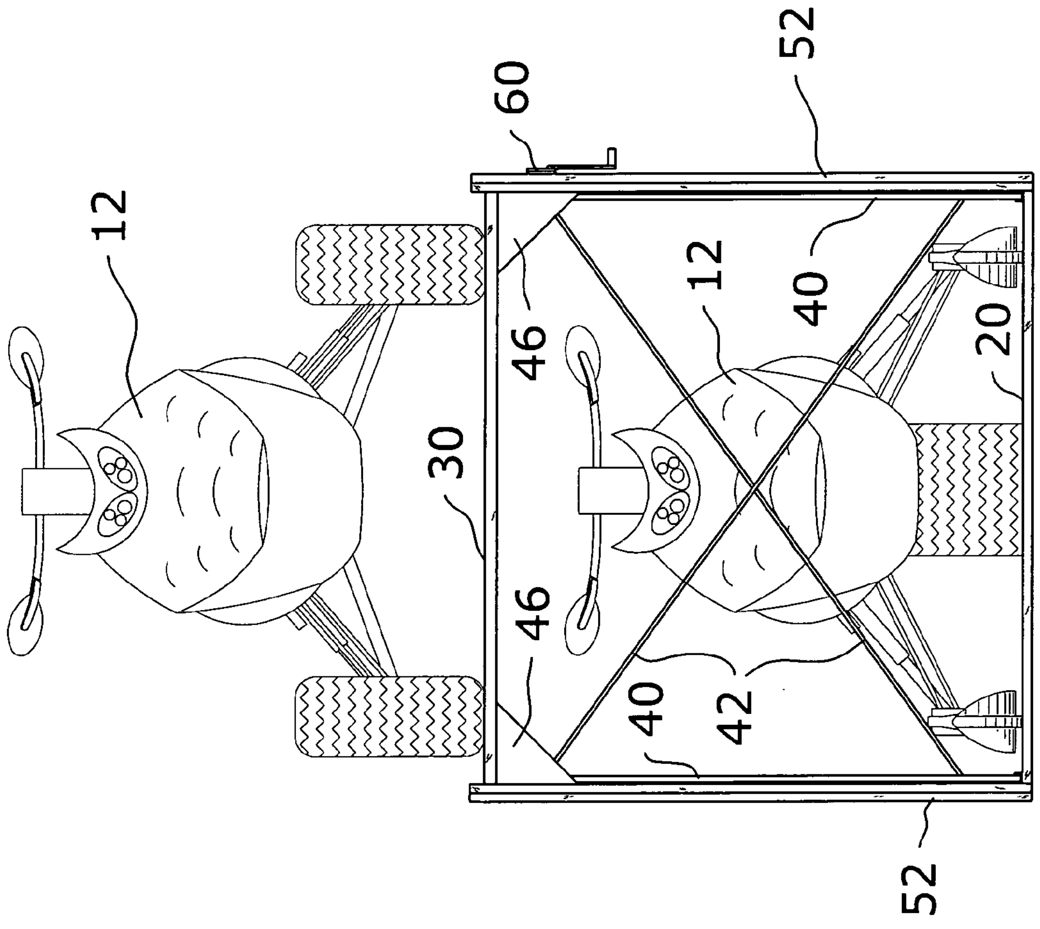
FIG. 7 is a front view of the present invention with an ATV positioned upon the platform and a snowmobile positioned upon the base.

In use, the user lowers the platform 30 by allowing the cable 62 within the winch 60 to extend from the winch 60. The platform 30 is lowered until near or upon the base 20 as shown in FIG. 3 of the drawings. Since the legs 40 are substantially equal in length, the platform 30 maintains a substantially level position throughout the lowering movement as shown in FIGS. 2 and 3 of the drawings. The user then drives the equipment 12 upon the platform 30 as shown in FIG. 4 of the drawings. As shown in FIGS. 5 and 6 of the drawings, the user then uses the winch 60 to draw the cable 62 into thereof thereby causing the platform 30 to be raised. The user then may insert the locking bar 70 between the angled braces 52 to prevent the platform 30 from accidentally lowering. The user is then able to drive a second piece of equipment 12 onto the base 20 beneath the platform 30 as shown in FIGS. 6 and 7 of the drawings.

What has been described and illustrated herein is a preferred embodiment of the invention along with some of its variations. The terms, descriptions and figures used herein are set forth by way of illustration only and are not meant as limitations. Those skilled in the art will recognize that many variations are possible within the spirit and scope of the invention, which is intended to be defined by the following claims (and their equivalents) in which all terms are meant in their broadest reasonable sense unless otherwise indicated. Any headings utilized within the description are for convenience only and have no legal or limiting effect.

I claim:

1. An equipment storage lift system, comprising:

a base comprised of a flat, solid and rectangular structure;

a platform comprised of a flat, solid and rectangular structure;

a plurality of legs each having a first end and a second end, wherein said first end of said legs are pivotally attached to said platform and wherein said second end of said legs are pivotally attached to said base, and wherein said legs are each substantially equal in length;

wherein said legs are comprised of a front pair of legs and a rear pair of legs;

wherein said front pair of legs are pivotally attached to respective front portions of said platform and said base, wherein said front pair of legs are connected to said base at a front pivot point;

wherein said rear pair of legs are pivotally attached to respective rear portions of said platform and said base, wherein said rear pair of legs are connected to said base at a rear pivot point;

wherein said rear pair of legs each have an angled bracket connected to said platform, wherein said angled bracket has an L-shaped structure;

wherein said rear pivot point is an off set pivot point;

wherein said front pivot point is above said rear pivot point;

a front structure extending from a front end portion of said base;

wherein said front structure includes a pair of angled braces extending from an upper portion of said front structure downwardly at an angle to said base;

a locking bar extendable through said angled braces;

a winch attached to said front structure, wherein said winch includes a cable attached to said platform for raising said platform to an elevated position and lowering said platform to a lowered position, wherein said platform is substantially parallel to said base when in said elevated position and when in said lowered position; and a first pulley attached to said front structure, a second pulley attached to a front portion of said platform and a third pulley attached to said front portion of said platform, wherein said cable extends from said winch through said first pulley then through said second pulley then through said third pulley with a distal end of said cable attached to said front structure.

2. The equipment storage lift system of claim 1, wherein said winch is hand operated.

* * * * *